R. R. OSGOOD.
FRICTION-CLUTCH.
No. 173,384. Patented Feb. 8, 1876.
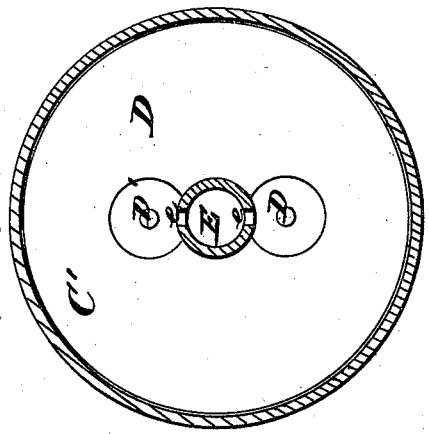
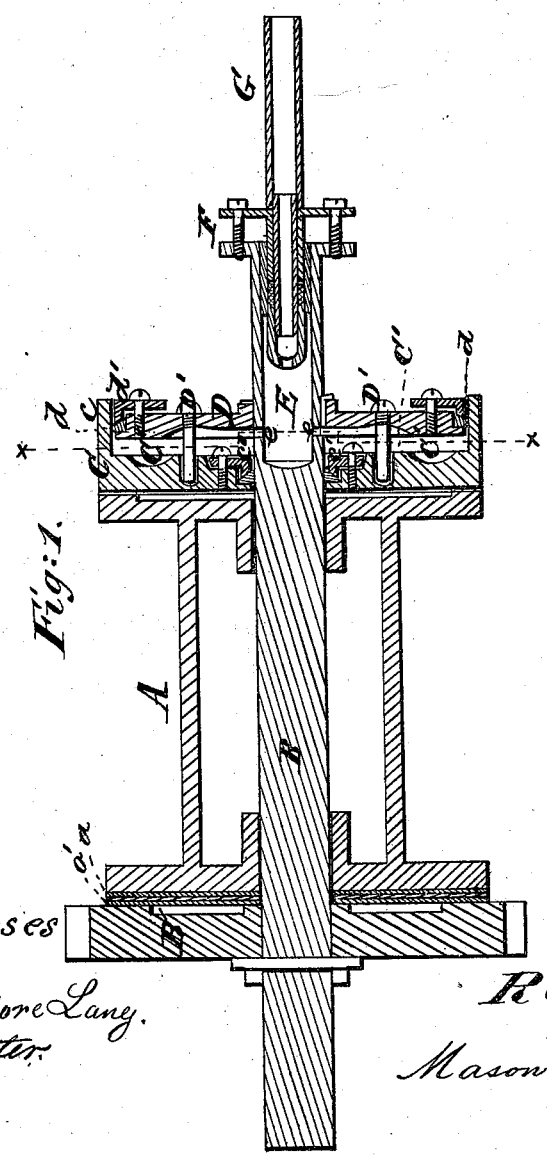
Witnesses
J. T. Theodore Lang.
Jno. S. Slater.
Inventor
Ralph R. Osgood
by
Mason Fenwick Lawrence
Attorneys.

UNITED STATES PATENT OFFICE.

RALPH R. OSGOOD, OF TROY, NEW YORK.

IMPROVEMENT IN FRICTION-CLUTCHES.

Specification forming part of Letters Patent No. 173,384, dated February 8, 1876; application filed December 3, 1875.

*To all whom it may concern:*

Be it known that I, RALPH R. OSGOOD, of Troy, in the county of Rensselaer and State of New York, have invented a new and useful Improvement in Friction-Clutches; and I do hereby declare the following to be a full, clear, and exact description thereof, reference being had to the accompanying drawings, in which—

Figure 1 is a vertical longitudinal section, and Fig. 2 a vertical transverse section in the line $x$ $x$ of Fig. 1, of a friction-clutch, illustrating my invention.

The nature of my invention consists in friction-clutches, constructed so as to be operated by the direct pressure of fluid, steam, air, or gases.

By my invention the necessity of using toggle-levers, screws, and other elementary mechanical powers as a means for transmitting the force necessary to produce the requisite friction for stopping machines which are in motion is avoided, and the most powerful direct pressure upon the friction device can be produced, which pressure can in an instant be withdrawn, and the machine again allowed to start; and while this is the case there is no liability under ordinary circumstances of the machinery which constitutes the clutching device being broken or becoming deranged.

My invention also consists in the employment of loose plates between the friction pulley or drum and the driving-gear wheel, for the purpose of preventing undue heating, wearing, and binding of the parts, when the pulley or drum is being moved backward.

In the drawings I show one form of device by means of which my invention may be utilized, but do not confine myself to either the peculiar form of construction or arrangement of parts as there shown, inasmuch as my invention may be applied to the purpose for which it is intended in many different ways, and through the aid of variously-contrived machinery.

A represents a friction pulley or drum, fitted loosely upon the shaft B, which carries the gear-wheel B', this latter being firmly keyed or fixed upon the shaft B by any of the well-known mechanical appliances. $a$ $a'$ are thin circular plates or disks, of metal, fitted loosely upon the shaft B, between the gear-wheel B' and loose pulley A, and are designed to prevent sticking of the parts A and B', while these parts are moving past one another. This object they accomplish by transmitting motion from one to the other, or, in other words, when the disk $a$ nearest the pulley becomes so heated and expanded as to remain fixed against the end of the pulley the next succeeding plate $a'$ will yet revolve freely, the lubricating material between plates $a$ and $a'$ not having been yet burned off by the heat generated by the friction between the pulley A and plate $a$.

Any number of these plates may be provided, and the more there are of them the longer will it take to destroy the lubricating material applied to them for the reasons stated; and even if no lubricating material remains, the liability to stick on the part of the pulley is greatly lessened by these plates.

C is a disk of metal, of a diameter about equal to the diameter of the loose pulley A, against one end of which it is intended to operate, and is fitted upon the shaft B, so as to be capable of a longitudinal horizontal movement.

By means of suitable packing, held in place by an annular gland, $c'$, the point of contact between the disk and shaft is made perfectly tight and secure against the escape of air, water, steam, or gas.

This disk C is provided with a flange or rim, $c$, projecting out from its face near its circumference, and at right angles to the plane of the face which comes in contact with the loose pulley A.

D is a disk keyed fast to the shaft B, and the diameter of which is such as permits it to fit closely within the flange $c$. Its periphery is provided with packing $d$, held in place by an annular gland, $d'$, and the fixed disk D is so arranged in reference to the movable disk C as to leave a perfectly air, water, steam, or gas tight chamber or space, C', between these faces at all times. D' D' are rods or guides upon which, together with the central shaft B, the disk C moves. These rods keep the disks C and D coupled together, and also insure the revolution of the part C with A when the clutch is being used. E is a chamber in that end of the shaft B upon which the clutch is arranged, and communicates, by the small openings $e\ e$, with the chamber $C'$ and with the boiler of a steam-engine or the supply-chamber of compressed air, gas, water, or other similar agent, by means of the pipe G, which is coupled to E, as at F. This pipe G is smaller in diameter than the chamber E and adapted to gradually induct the steam, fluid, air, or gas into the chamber. It is also supplied with a two-way cock or other suitable inletting and outletting device, (not shown in the drawing,) or with any well-known appliances for letting in and out agents such as mentioned herein.

By use of a two-way cock in the pipe G, between the point where it enters the boiler and the friction-pulley, the steam or other fluid may be gradually admitted to the chamber E, and from thence, through the openings $e\ e$, into the chamber $C'$, and when the steam is shut off from the boiler the contents of the chambers $C'$ and E escape through the other way of the cock into the atmosphere.

The operation of my improved frictional clutch is as follows: Supposing the pipe G to be connected with the boiler of a steam-engine and the pulley A at rest—that is, not in operation for lifting or other purposes—then the various parts of that form of my improved frictional clutch which I have described will appear as shown in the drawing, Fig. 1.

If it is desired to throw the pulley or drum A into motion, steam is admitted through the pipe G into the chamber E, whence it gains an entrance, through the openings $e\ e$, into the chamber $C'$. The small size of these openings and of the end of the pipe G admits the steam gradually and in a continuous stream, thus obviating any danger of sudden jar or concussion.

As the steam fills the chamber $C'$, the disk C is brought in contact with the end of the pulley A, which is forced against the gear-wheel $B'$ with a steady pressure of any required degree, regulated by the steam-cock, and the frictional contact thus produced will cause the pulley to revolve with the gear-wheel.

If it is desired to partially retard the revolution of the pulley, the supply of steam is reduced in quantity, and, by carefully regulating the quantity of steam, any desired amount of friction may be secured.

It will be perceived in this connection that, while the stops $D'\ D'$ prevent the chambered disk C from revolving independently of the shaft B, they permit it to move longitudinally thereon; but the various parts of the clutch are so arranged with reference to each other as to prevent the disk C, in its longitudinal motion, from becoming detached from or uncovering the periphery of the disk D, which rests within the flange $c$.

It is obvious that during the time the clutch is in operation the plates $a\ a'$ are so closely held between the pulley A and the fixed gear-wheel $B'$ as to render their movement independent of each other and of the shaft B impossible; but when the steam or other agent is shut off, so that the pressure upon the disk C is diminished or ceases altogether, then the plates perform their proper functions, as already described; and in the reverse or backward movement of the drum or pulley A the services of these plates are especially beneficial.

Having thus described my invention, what I claim, and desire to secure by Letters Patent, is—

1. A friction-clutch, having a clutching plate or disk arranged in a steam, air, gas, or fluid chamber, moved and made to produce the clutching operation by the direct contact with it of the motive agent employed within the chamber, substantially as described.

2. Loose plates $a$, interposed between the wearing-surfaces of friction-clutches, for the purpose of overcoming the effect of heat induced by friction during the operation of the drum in its backward movement, substantially as described.

RALPH R. OSGOOD.

Witnesses:
E. J. MIDDLETON, Jr.,
WM. P. YOUNG.